United States Patent
Muthiah (10) Patent No.: US 11,575,978 B2
(45) Date of Patent: Feb. 7, 2023

(54) DATA STORAGE DEVICE AND METHOD FOR RELIABLE WATERMARKING

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/335,649

(22) Filed: Jun. 1, 2021

(65) Prior Publication Data

US 2022/0385995 A1 Dec. 1, 2022

(51) Int. Cl.
*H04N 21/8358* (2011.01)
*G06F 21/16* (2013.01)
*G06T 1/00* (2006.01)

(52) U.S. Cl.
CPC ......... *H04N 21/8358* (2013.01); *G06F 21/16* (2013.01); *G06T 1/0021* (2013.01)

(58) Field of Classification Search
CPC .... H04N 21/8358; G06F 21/16; G06T 1/0021
See application file for complete search history.

(56) References Cited

U.S. PATENT DOCUMENTS

| | | | |
|---|---|---|---|
| 7,434,057 B2 | 10/2008 | Yagawa | |
| 8,166,302 B1 | 4/2012 | Shih | |
| 8,848,791 B2 | 9/2014 | Xue et al. | |
| 9,253,485 B2 | 2/2016 | Celik et al. | |
| 10,841,645 B1 | 11/2020 | Muthiah | |
| 2009/0220070 A1 | 9/2009 | Picard et al. | |
| 2010/0070532 A1 | 3/2010 | Moribe et al. | |
| 2010/0115616 A1 | 5/2010 | Jogand-Coulomb | |
| 2010/0128921 A1 | 5/2010 | Alattar et al. | |
| 2012/0308071 A1* | 12/2012 | Ramsdell | H04N 21/812 382/100 |
| 2017/0126631 A1* | 5/2017 | Vikramaratne | H04L 63/0428 |
| 2018/0091871 A1 | 3/2018 | Nakagata | |
| 2018/0295172 A1* | 10/2018 | Vikramaratne | H04L 65/70 |
| 2022/0019805 A1* | 1/2022 | Zou | G06K 9/6218 |

OTHER PUBLICATIONS

Ahmad Hassanat; "Main Types of Watermarking Techniques"; downloaded from the Internet at https://www.researchgate.net/figure/Main-types-of-Watermarking-techniques_fig1_316527 on Apr. 5, 2021; ResearchGate GmbH; 2017; 4 pages.
International Search Report dated May 11, 2022 for International Application No. PCT/US2022/013830.
Written Opinion dated May 11, 2022 for International Application No. PCT/US2022/013830.

* cited by examiner

*Primary Examiner* — Mohammad W Reza
(74) *Attorney, Agent, or Firm* — Crowell & Moring LLP (57) ABSTRACT

A data storage device and method for reliable watermarking are provided. In one embodiment, a data storage device is provided comprising a memory and a controller. The controller is configured to determine whether a watermarking operation to be performed on the data is to be performed by the controller or by the memory; in response to determining that the watermarking operation is to be performed by the controller, performing the watermarking operation; and in response to determining that the watermarking operation is to be performed by the memory, instruct the memory to perform the watermarking operation. Other embodiments are provided.

20 Claims, 6 Drawing Sheets

DATA STORAGE DEVICE AND METHOD FOR RELIABLE WATERMARKING

BACKGROUND

A host can embed a digital watermark into data before the data is stored in a data storage device. The watermark can identify ownership of the data. If an unauthorized copy of the data is later found, the watermark can be retrieved to determine the source of the distribution.

DETAILED DESCRIPTION

Overview

By way of introduction, the below embodiments relate to a data storage device and method for reliable watermarking. In one embodiment, a data storage device is provided comprising a memory and a controller. The controller is configured to determine whether a watermarking operation to be performed on the data is to be performed by the controller or by the memory; in response to determining that the watermarking operation is to be performed by the controller, performing the watermarking operation; and in response to determining that the watermarking operation is to be performed by the memory, instruct the memory to perform the watermarking operation.

In some embodiments, the controller is further configured to determine whether the watermarking operation is to be performed by the controller or by the memory based on an importance of the data.

In some embodiments, the memory comprises a plurality of memory dies, each of which is configured to perform the watermarking operation in parallel with the other memory dies.

In some embodiments, the controller is further configured to determine a type of watermarking operation to perform on the data.

In some embodiments, the watermarking operation is performed as a read path operation.

In some embodiments, the watermarking operation is performed as a write path operation.

In some embodiments, the controller is further configured to receive a host identifier from the host, and the type of watermarking operation is determined based on the host identifier.

In some embodiments, the type of watermarking operation is determined based an endurance group in the memory in which the data is stored.

In some embodiments, the type of watermarking operation is determined based on a quality of service requirement.

In some embodiments, the type of watermarking operation is determined based on an accessed logical region of the memory.

In some embodiments, the type of watermarking operation is determined based on a workload of the data storage device.

In some embodiments, the watermarking operation is performed on compressed data.

In some embodiments, the watermarking operation is performed by decoding the data and then re-encoding the data with a watermark.

In some embodiments, the watermarking operation is based on a secret key provided to the data storage device by the host.

In some embodiments, the data is video data.

In some embodiments, the memory comprises a three-dimensional memory.

In another embodiment, a method is performed in a data storage device comprising a memory. The method comprises: receiving a video stream from a host; identifying a plurality of video frame types from the video stream; storing video frames of different video frame types in different areas of the memory, wherein each of the different areas of the memory is associated with a different watermarking operation; and performing watermarking operations on the video frames, wherein a type of watermarking operation performed on a video frame is based on an area of the memory where the video frame is stored.

In some embodiments, the different memory areas comprise different memory dies, each of which is configured to perform a different watermarking operation.

In some embodiments, the watermarking operations are performed by a controller of the data storage device.

In some embodiments, the different areas of memory comprise different endurance groups.

In some embodiments, the different video frame types comprise intra-coded picture frames (I-frames), predicted picture frames (P-frames), and bidirectional predicted picture frames (B-frames).

In another embodiment, a data storage device is provided comprising: a memory; means for storing data in different areas of the memory; and means for performing different watermarking operations on the data, wherein a type of watermarking operation that is performed is based on an area of the memory where the data is stored.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
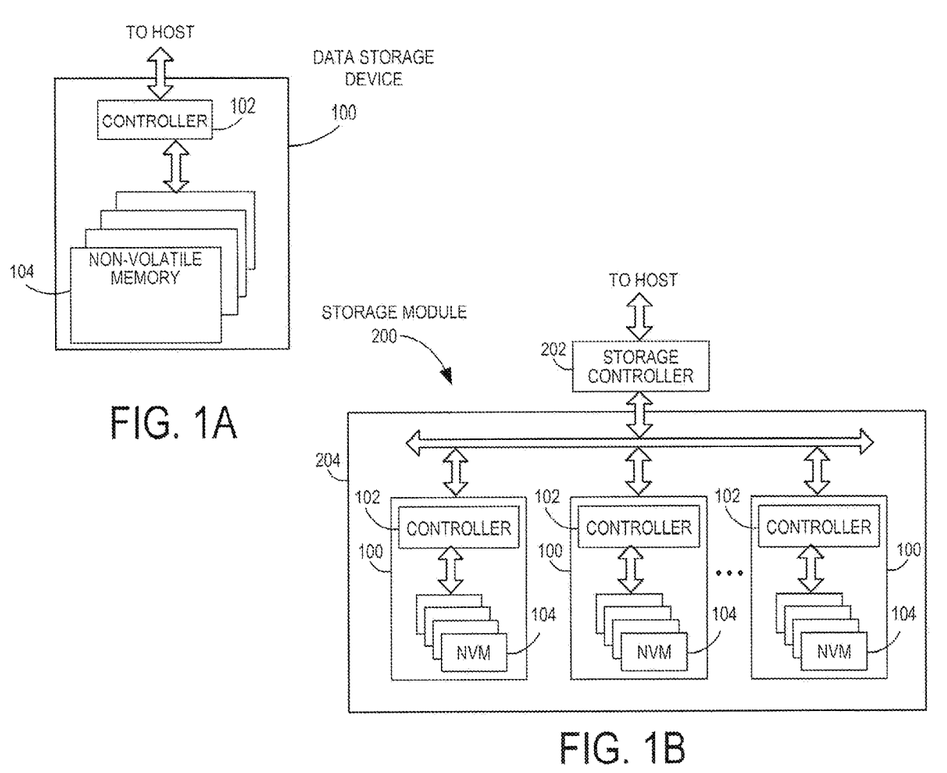
FIG. 1A is a block diagram of a data storage device of an embodiment.
FIG. 1B is a block diagram illustrating a storage module of an embodiment.
Figure 1C:
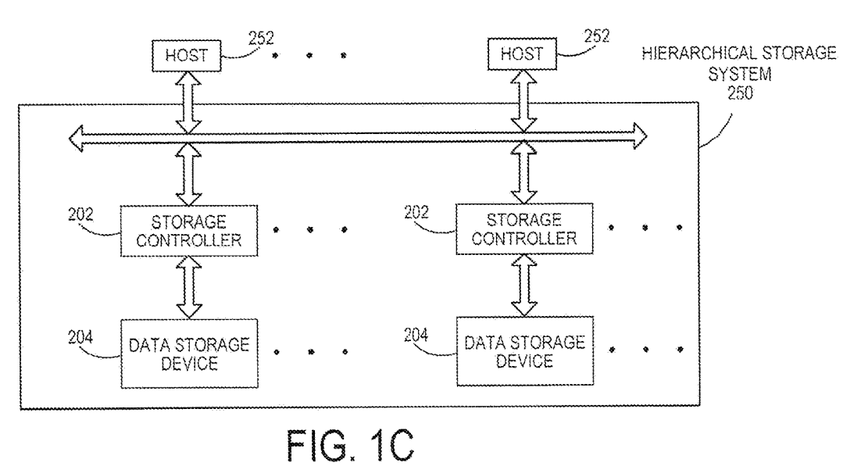
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
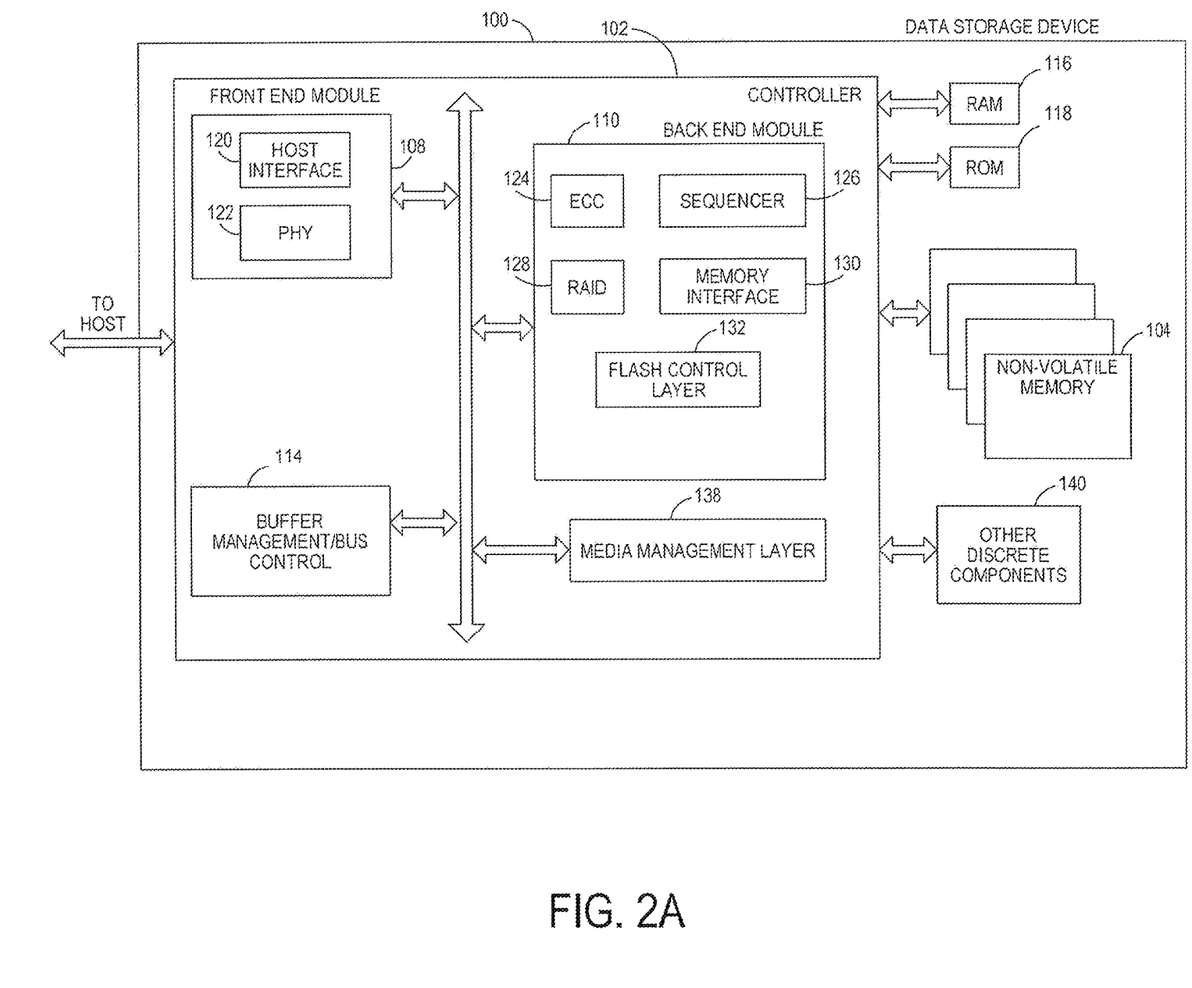
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
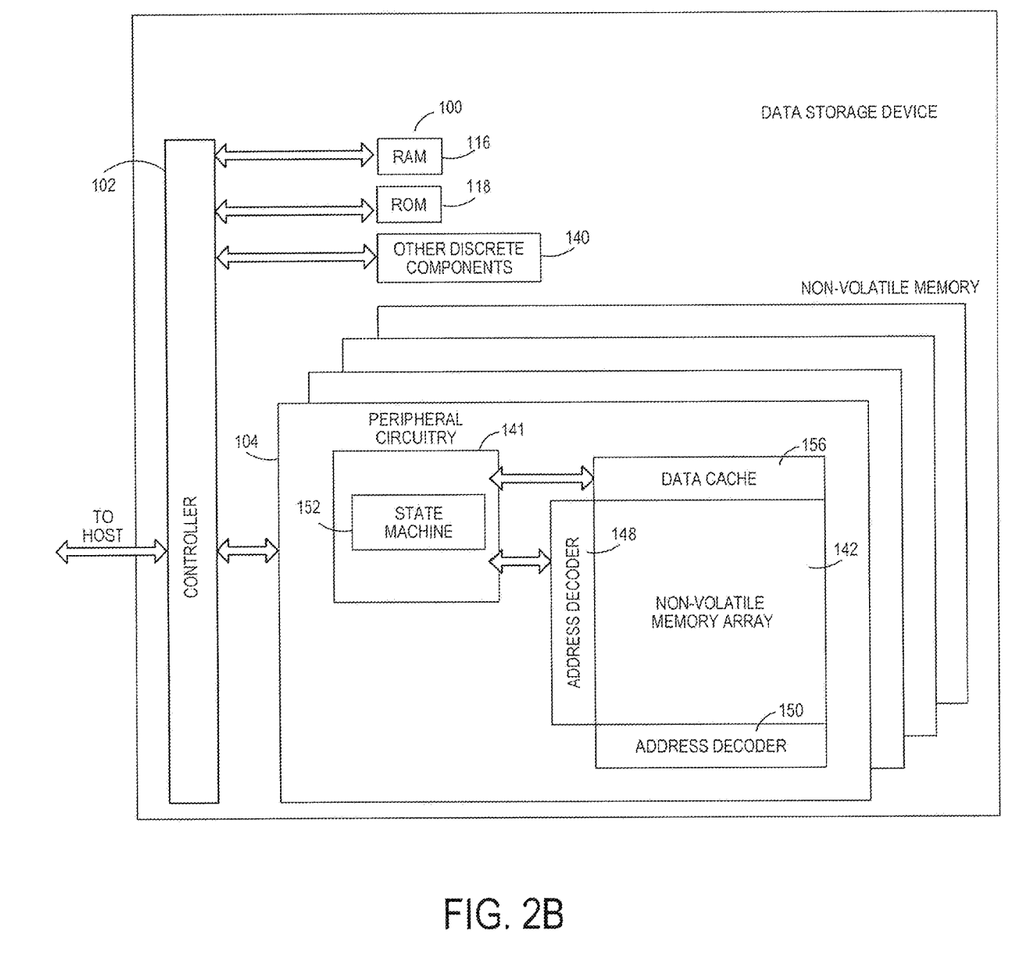
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
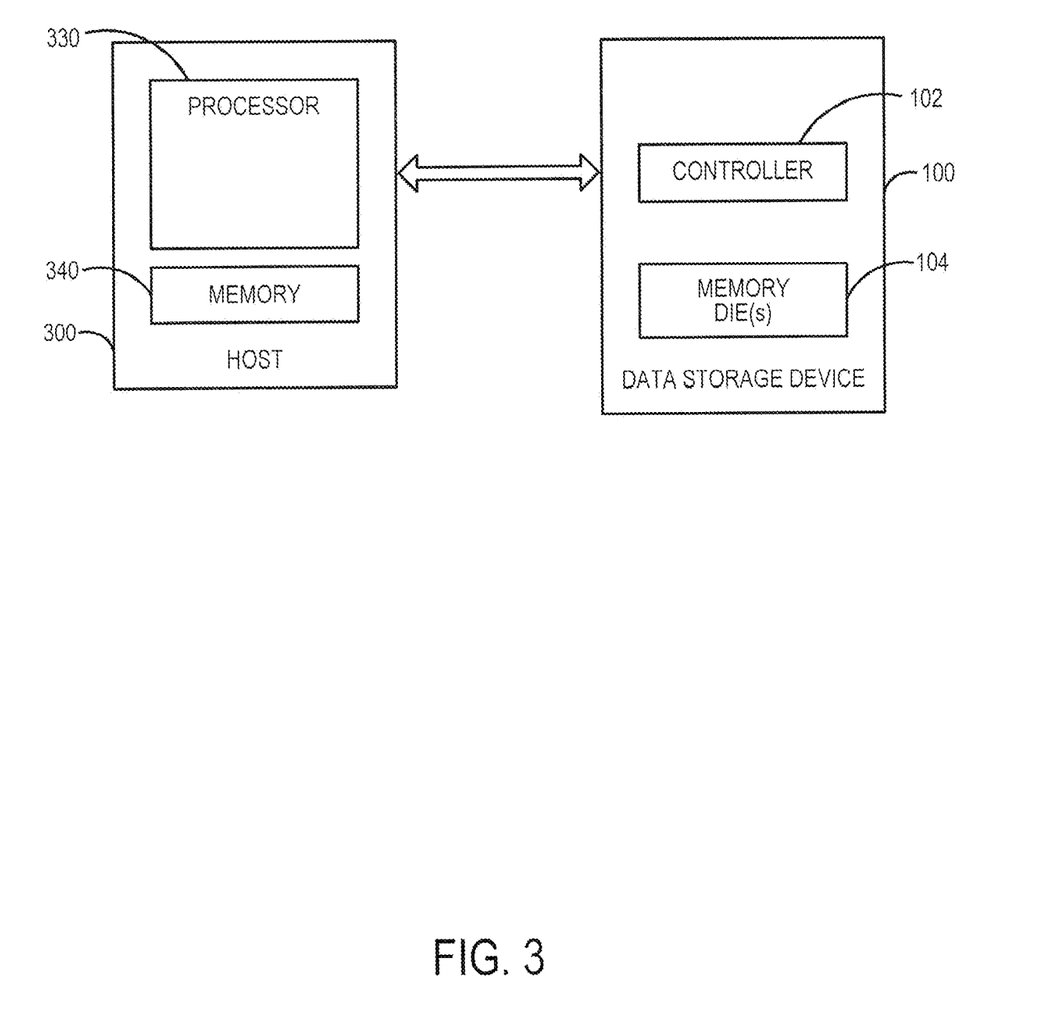
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

The data storage device can be used to store any type of data. In some situations, a digital watermark is covertly or openly embedded in the data by the host before the data is stored in the data storage device. A "digital watermark" can refer to a marker that is placed in digital content, such as audio, video, image, or text data. The marker can be introduced in any suitable object, such as, for example, in a noise-tolerant carrier signal used to create digital content. The needed properties of a digital watermark depend on the use case in which it is applied. For example, for marking media files with copyright information, a digital watermark can be rather robust against modifications that can be applied to the carrier signal. As another example, if integrity has to be ensured, a more-fragile watermark can be applied. There are many types of watermarking that can be used and can relate to, for example, used material, domain of watermarking, human recognition, and application.

One application of digital watermarking is source tracking and takes advantage of the fact that an embedded marker can be used to identify ownership of the data and to trace copying of the data. In source tracking, a watermark is embedded into a digital signal at each point of distribution. If a copy of the work is found later, then the watermark may be retrieved from the copy to determine the source of the distribution. In this way, watermarking can be considered a mechanism for providing copyright protection to digital content for its entire lifetime.

The watermarked digital signal is transmitted or stored, usually transmitted to another person. If this person makes a modification, it is called a watermarking attack. While the modification may not be malicious, the term "attack" arises from the copyright protection application, where third parties may attempt to remove the digital watermark through modification (e.g., lossy compression of data (in which resolution is diminished), cropping an image or video, or intentionally adding noise).

Watermarking detection (often called extraction) refers to an algorithm that is applied to the attacked signal to attempt to extract the watermark from it. If the signal was unmodified during transmission, then the watermark is still present, and it may be extracted. In robust digital watermarking applications, the extraction algorithm should be able to produce the watermark correctly, even if the modifications were strong. In fragile digital watermarking, the extraction algorithm should fail if any change is made to the signal.

Typically, watermarking is performed by a system with access to a data storage device over a network. However, there may be several disadvantages associated with that ecosystem. For example, for dynamic watermarking requirements involving different watermarking algorithms, such as robust or fragile watermarking, the host may need to fetch the data from the data storage device to embed the watermark and then send the data back. This two-way transfer of full media data for every request results in a back-and-forth that is an unnecessary overhead. Also the host may be vulnerable to attack since the interface to raw data in the data storage system may be open. So, performing watermarking away from where the data actually resides makes the data vulnerable to copying and other attacks. Additionally, it can be difficult to manage host-identifier-based watermarking in a share system, as well as logical-data-criticality-based watermarking.

In the following embodiments, the data storage device 100—not the host 300—manages the watermarking process to overcome the problems discussed above. Additionally, the data storage device 100 can provide watermarking functionality that the host 300 may not be able to provide that can improve the overall reliability and quality of service of the watermarking.

Figure 4:
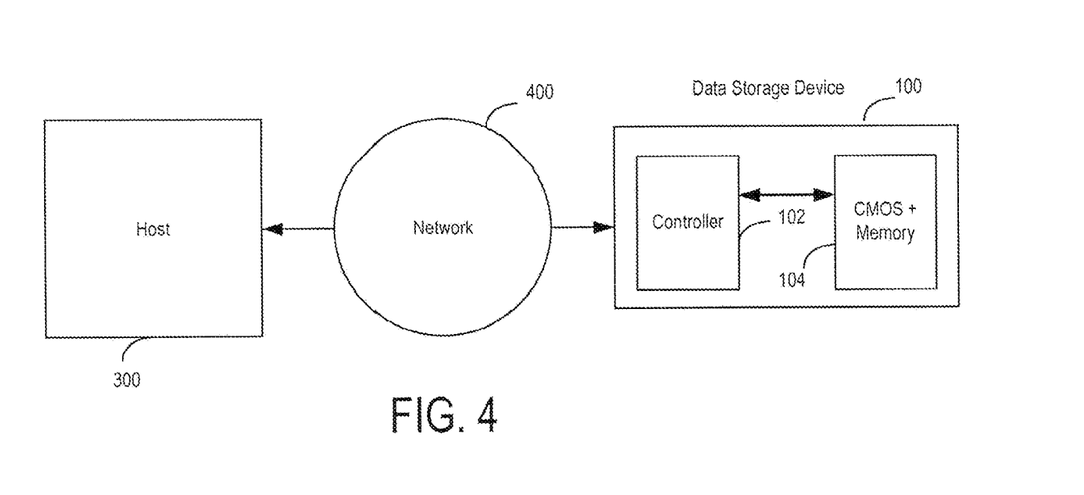
FIG. 4 is a block diagram of a host and data storage device of an embodiment.

In one embodiment (shown in FIG. 4), the data storage device 100 is in communication with the host 300 over a network 400, although a local connection is also possible. In this embodiment, both the controller 102 and the memory 104 are capable of performing a watermarking operation on data stored in the memory 104. For example, the controller 102 can have dedicated hardware and/or a processor that executes code to perform this function. Also, the memory can have some computational capability (e.g., XOR circuitry, a complementary metal-oxide-semiconductor (CMOS) under the memory array (CUA), or a reduced instruction set computer (RISC) processor) that is configured to perform a watermarking operation. If the memory 104 comprises a plurality of memory dies, each memory die can be configured to perform the watermarking operation in parallel with the other memory dies. Such load sharing can leverage parallel processing to perform efficient and reliable watermarking on various data.

Figure 5:
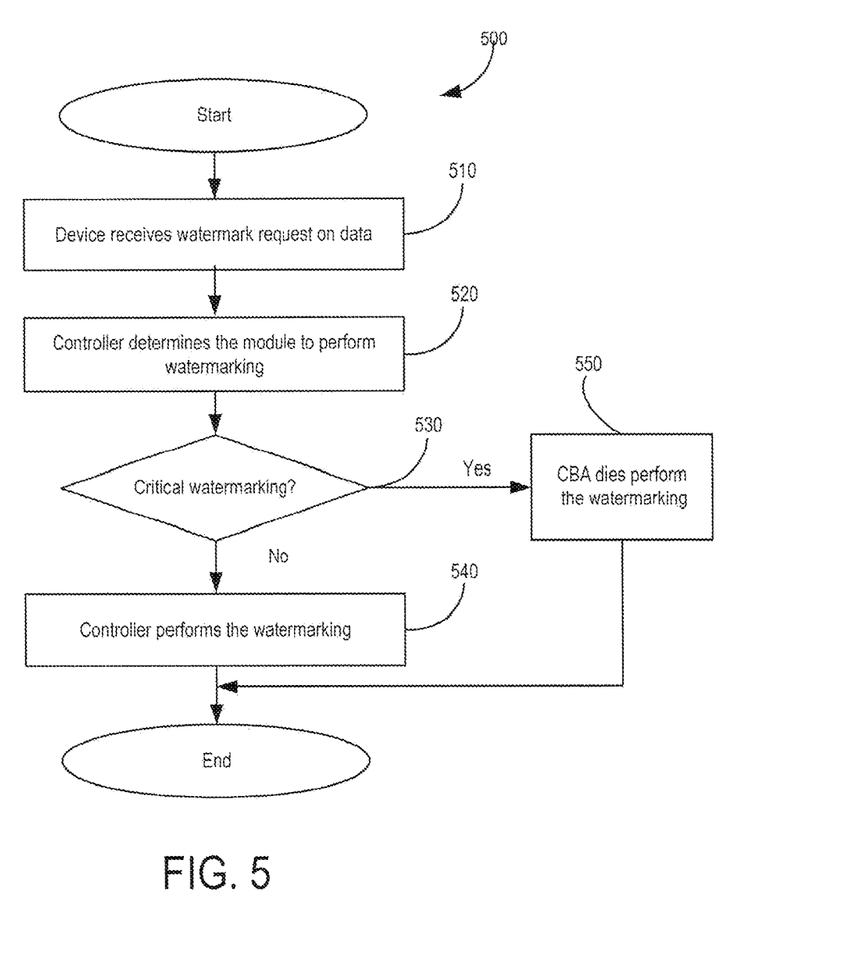
FIG. 5 is a flow chart of a method of an embodiment for determining which component of a data storage device performs a watermarking operation.

FIG. 5 is a flow chart 500 of a method of an embodiment for determining whether the controller 102 or the memory 104 should perform the watermarking operation. As shown in FIG. 5, the data storage device 100 receives a request to perform a watermarking operation on data stored in the memory 104 (act 510). This request can take any suitable form and may simply be a request from the host 300 to read the data (so, the watermarking operation would be a read path operation). Alternatively, the watermarking operation can be a write path operation, such that the controller 102 performs the watermarking operation prior to writing the data in the memory 104. Next, the controller 102 determines whether it or the memory 104 should perform the watermarking operation (act 520). The controller 102 can make this determination in any suitable way. For example, the controller 102 can base the decision on the importance of the data (e.g., how critical it is to protect the data with watermarking) (act 530). If the importance of the data is below a threshold or some other criteria, the controller 102 performs the watermarking operation (act 540). On the other hand, if the controller 102 determines that the data is relatively important, the controller 102 instructs the memory 104 to perform the watermarking operation (act 550). This instruction can take any suitable form and may simply be an assertion of a signal on a control line to the memory 104.

Having the watermarking operation be performed by the data storage device 100 instead of the host 300 provides a level of reliability, as compared to the host 300 retrieving the data and then applying the watermark. That is, because the watermark is provided to the data before the data is released to the host 300, there is no risk of non-watermarked data being intercepted during the transmission from the data storage device 100 to the host 300. However, there is a risk of the non-watermarking data being intercepted during transmission from the memory 104 to the controller 102, if the controller 102 is the entity that is performing the watermarking operation. So, having the watermarking done by the memory 104 instead eliminates this risk and further increases reliability of the watermark. However, doing so may consume memory resource and may be slower than if the controller 102 were to perform the watermarking. Also, in some situations, the risk of data being intercepted within the data storage device 100 may be low. So, the method shown in FIG. 5 attempts to strike a balance where the memory 104 is tasked with watermarking data that is considered important to eliminate the risk of flash channels being tapped for raw data and to increase the security of the system.

It should be noted that the controller 102 and/or memory 104 can perform the watermarking operation in any suitable manner. For example, in one embodiment, the watermarking operation is performed on compressed data (e.g., without the need for transcoding), while, in another embodiment, the watermarking operation is performed by decoding the data and then re-encoding the data with a watermark. The fact that the watermark can be embedded into an encoder (e.g., video encoder) or separately onto compressed data (e.g., video frames) increases the flexibility in how the data storage device 100 wants to add watermarking to data. There is increased flexibility and, hence, multiple options owing to the processing capability being closer to data. Further, in some embodiments, the watermarking operation is based on a secret key provided to the data storage device 100 by the host 300.

Any suitable type of watermarking can be used, including, but not limited to, robust watermark, fragile watermark, digital fingerprint, and visible and invisible watermarks. Also, the data storage device 100 can be configured to perform multiple types of watermarking operations and can chose which type to use using any suitable technique. For example, in one embodiment, the host 300 provides a host identifier (ID) (e.g., indicating host configuration information), and the type of watermarking operation is determined based on the host identifier. This may be desired in Non-Volatile Memory Express (NVMe) environments where multiple hosts may write and retrieve data from the data storage device 100 (e.g., as in an automotive use case). Based on the accessing party, the controller 102 or a memory die may dynamically run a watermarking algorithm based on a predetermined configuration. So, based on a retrieving Host ID or a related parameter, the controller 102 or memory die can embed invisible information into the digital data, which another entity can use to extract to prove copyright ownership. Alternatively, the watermarking can be used for media/data authentication and tampering detection.

As another example, the type of watermarking operation can be determined based an endurance group in the memory 104 in which the data is stored or on an accessed logical region of the memory 104. In this way, watermarking can be configured dynamically with different configurations for different endurance groups in the NVMe system.

Figure 7:
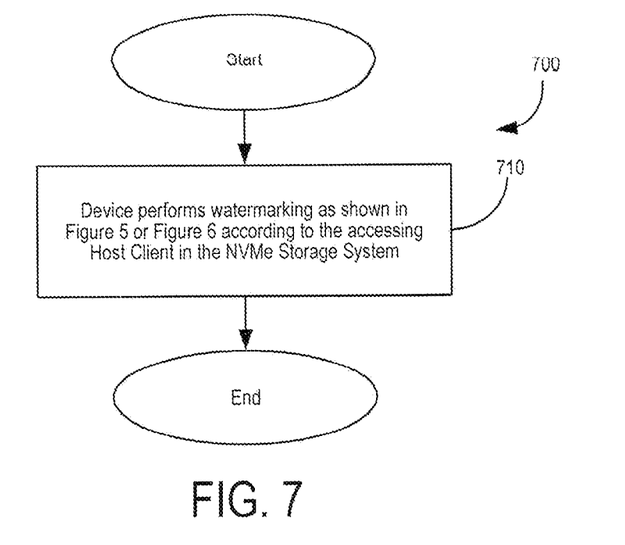
FIG. 7 is a flow chart of a method of an embodiment for performing a watermarking operation in a Non-Volatile Memory Express (NVMe) environment.

In a particular NVMe use case in a multi-host environment, multiple parties access shared and private namespaces. In an example, the data storage device 100 determines to perform one type of watermark (e.g., invisible) according to a Host ID. In another example, the controller 102 determines the type of watermarking based on the accessed logical region of the data, such as different namespaces (shared/private) or different endurance groups attached to different retrieval mechanisms. In such a condition, the data storage device 100 can execute a watermarking algorithm prior to sharing data from a shared namespace and may allow raw data retrieval from other namespaces. Likewise, multiple types of watermarking can be performed in-house prior to releasing data to different hosts.

As other examples, the type of watermarking operation can be determined based on a quality of service (QoS) requirement and/or on the workload of the data storage device 100. For example, in higher frame rate bit streams, the data storage device 100 can watermark fewer number of frames, whereas in lower frame rate systems, the data storage device 100 can watermark more frames. The data storage device 100 may also choose to perform the processing on only a few frames of a group of pictures (GOP), such as an intra-coded picture frames (I-frames) or instantaneous decoder refresh (IDR) frames based on its own workload and watermarking QoS requirements.

Figure 6:
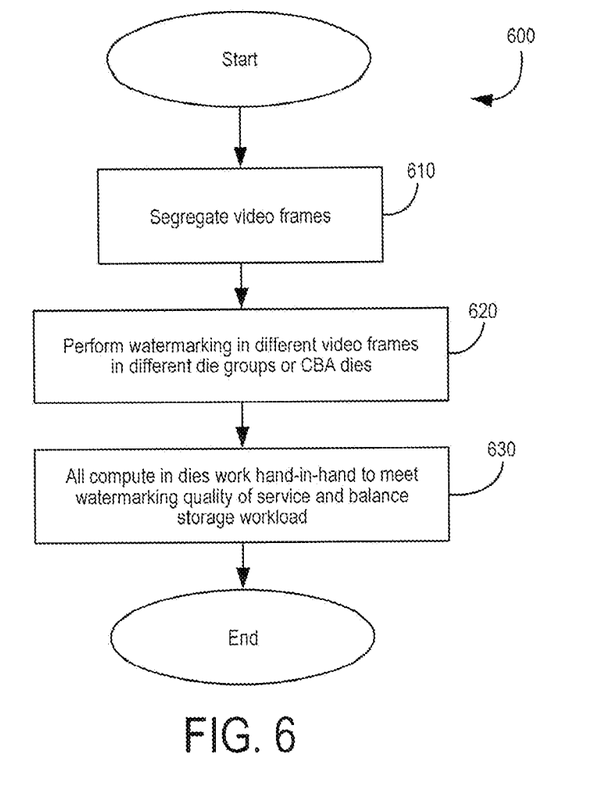
FIG. 6 is a flow chart of a method of an embodiment for segregating video frames and applying different watermarking operations to different types of video frames.

As mentioned above, the data can take any suitable form, such as video, audio, image, or text data. Depending on the type of data, different segments of the data can be segregated, so different types of watermarking operations can be performed on the different segments of data. For example, when the data takes the form of video (e.g., surveillance video, the video stream may be in the Moving Picture Experts Group Transport Stream (MPEG-TS) format. In that format, different video frames are compressed using different compression algorithms, and such different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

When the data storage device 100 receives a video stream for storage, the controller 102 can use a video frame segregator to extract elementary streams (ESs) from the audio and video packed identifiers (PIDs) of each video program (i.e., the PIDs are extracted from the MPEG-TS, then the corresponding audio/video ESs are obtained from those program PIDs). The elementary streams are the outputs of the audio/video encoders of the cameras that contain only one kind of data (e.g., audio or video). Based on the information in the packet identifiers, the video frame segregator can identify the various video frame types in the video stream. With this information, the video frame segregator can separately extract the I-, B-, and/or P-frames.

The controller 102 can store the different frames in different areas of the memory 104 (e.g., in different memory dies). For example, the I-frames can be stored in an area of the memory 104 with a high level of protection and read recoverability option, while B- and P-frames can be routed to areas of the memory 104 with fast fail or a default storage options. More information about segregated and separately storing video frames can be found in U.S. Pat. No. 10,841,645, which is hereby incorporated by reference.

In one embodiment, each of the different areas of the memory 104 where video frames are stored is associated with a different watermarking operation, and the data storage device 100 can perform watermarking operations on the video frames based on the area of the memory 104 where the video frames are stored. For example, the controller 102 can have a video frame segregator and management module to segregate the video frames and also the different types of watermarking based on the frame type/memory location. Alternatively, the memory dies can be configured to independently execute watermarking on frames (e.g., belonging to a group of pictures).

There are several advantages associated with these embodiments. The various embodiments discussed above can provide reliable watermarking in data storage devices, video frame segregation and video-specific watermarking, watermarking that can provide benefits in an NVMe environment, and flexibility in the context of video watermarking. These embodiments can be used alone or in combination. Performing watermarking in the data storage device 100 can optimize multiple types (strengths) of watermarking based on the retrieving party in a multi-host or cloud environment. Further, performing watermarking in the data storage device 100 can limit unwanted data leakage and allow multiple levels of media data protection dynamically. In addition, the embodiments provide flexibility and can avoid data transfer overhead for executing watermarking algorithms.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A data storage device comprising:
a memory; and
a processor configured to:
receive a command from a host to read data stored in the memory;

determine whether an importance of the data is above a threshold;

in response to determining that the importance of the data is not above the threshold, perform a watermarking operation on the data; and in response to determining that the importance of the data is above the threshold, instruct the memory to perform the watermarking operation on the data, wherein instructing the memory to perform the watermarking operation on the data eliminates a risk of the data being intercepted in transit from the memory to the processor in a non-watermarked form.

2. The data storage device of claim 1, wherein the memory comprises a plurality of memory dies, each of which is configured to perform the watermarking operation in parallel with the other memory dies.

3. The data storage device of claim 1, wherein the processor is further configured to determine a type of watermarking operation to perform on the data.

4. The data storage device of claim 3, wherein:
the processor is further configured to receive a host identifier from a host; and
the type of watermarking operation is determined based on the host identifier.

5. The data storage device of claim 1, wherein the type of watermarking operation is determined based an endurance group in the memory in which the data is stored.

6. The data storage device of claim 1, wherein the type of watermarking operation is determined based on a quality of service requirement.

7. The data storage device of claim 1, wherein the type of watermarking operation is determined based on an accessed logical region of the memory.

8. The data storage device of claim 1, wherein the type of watermarking operation is determined based on a workload of the data storage device.

9. The data storage device of claim 1, wherein the watermarking operation is performed by decoding the data and then re-encoding the data with a watermark.

10. The data storage device of claim 1, wherein the watermarking operation is performed as a read path operation.

11. The data storage device of claim 1, wherein the processor is further configured to perform an additional watermarking operation as a write path operation.

12. The data storage device of claim 1, wherein the data is video data.

13. The data storage device of claim 1, wherein the memory comprises a three-dimensional memory.

14. A method comprising:
performing the following in a processor in a data storage device comprising a memory:
determining whether an importance of data stored in the memory is above a threshold;
in response to determining that the importance of the data is not above the threshold, performing a watermarking operation on the data; and
in response to determining that the importance of the data is above the threshold, instructing the memory to perform the watermarking operation on the data, wherein instructing the memory to perform the watermarking operation on the data eliminates a risk of the data being intercepted in transit from the memory to the processor in a non-watermarked form.

15. The method of claim 14, wherein the data comprises a video stream comprising a plurality of video frame types.

16. The method of claim 14, wherein the different video frame types are stored in different memory areas.

17. The method of claim 15, wherein the different video frame types comprise intra-coded picture frames (I-frames), predicted picture frames (P-frames), and bidirectional predicted picture frames (B-frames).

18. A data storage device comprising:
a memory;
means for determining whether an importance of data stored in the memory is above a threshold;
means for performing a watermarking operation on the data in response to determining that the importance of the data is not above the threshold; and
means for instructing the memory to perform the watermarking operation on the data in response to determining that the importance of the data is above the threshold, wherein instructing the memory to perform the watermarking operation on the data eliminates a risk of the data being intercepted in transit from the memory to a processor in a non-watermarked form.

19. The method of claim 16, wherein the different memory areas comprise different endurance groups.

20. The method of claim 16, wherein the different memory areas comprise different memory dies, each of which is configured to perform a different watermarking operation.

* * * * *